United States Patent

[11] 3,625,831

[72] Inventors Arnold L. Demain
Westfield;
Raymond F. White, Englishtown; Lubove
D. Schnable, Fanwood, all of N.J.
[21] Appl. No. 793,591
[22] Filed Jan. 23, 1969
[45] Patented Dec. 7, 1971
[73] Assignee Merck & Co., Inc.
Rahway, N.J.

[54] PRODUCTION OF (-) (CIS 1,2 EPOXYPROPYL) PHOSPHONIC ACID
10 Claims, No Drawings

[52] U.S. Cl. .................................................... 195/80,
195/114
[51] Int. Cl. ................................................... C12d 9/00
[50] Field of Search ........................................ 99/114,
117, 80

[56] References Cited
UNITED STATES PATENTS
2,474,139   6/1949   Block ........................... 195/114 X
2,957,810   10/1960   Johnson et al. ............... 195/80

OTHER REFERENCES

Kirby et al., " Aerobic Fermentation," Ind. & Eng. Chem. May 1939, page 596

Derwent Farmdoc #35893, Abstracting BE 718507, Publ. 1-24-69 (195- 80)

Primary Examiner—Joseph M. Golian
Attorneys—John Frederick Gerkens, J. Jerome Behan and I. Louis Wolk ABSTRACT: (−) (Cis-1,2-epoxypropyl) phosphonic acid is produced in enhanced yields by growing suitable species of *Streptomyces* in fermentation mediums containing a mercapto-containing compound. The phosphonic acid and derivatives thereof, such as salts, are antibacterial substances which are active against both gram-positive and gram-negative bacteria.

PRODUCTION OF (-) (CIS 1,2 EPOXYPROPYL) PHOSPHONIC ACID

The discovery of the remarkable antibiotic properties of penicillin stimulated great interest in this field which has resulted in the finding of many other valuable antibiotic substances such as streptomycin, gramicidin, subtilin, bacitracin, chlortetracycline, oxytetracycline and the like. In general, such antibiotics are particularly active against certain gram-negative bacteria, others are active against gram-positive bacteria, and some are active against both gram-negative and gram-positive bacteria. However, the activity of these known antibiotics is usually limited to a few pathogenic micro-organisms, and work has been continued in this field in an attempt to find other antibiotics which would be effective against other pathogens.

Although some of these antibiotics have been found to be invaluable in the treatment of various diseases, it is found that certain strains of some pathogens develop a resistance to a particular antibiotic, and as a result, the antibiotic is no longer active against such resistant strains.

Accordingly, the deficiencies of the known antibiotics have stimulated further research to find other antibiotics which will be active against a wider range of pathogens as well as resistant strains of particular micro-organisms.

(-) (Cis-1,2-epoxypropyl)phosphonic acid, an antibiotic substance active against various pathogens, is produced by growing suitable species of Streptomyces in media containing suitable sources of carbon, nitrogen and inorganic salts. However, the yields of antibiotic obtainable in the usual fermentation media are low and means for producing the antibiotic in enhanced yields have been sought.

SUMMARY OF THE INVENTION

This invention is concerned with improved processes for producing (-) (cis-1,2-epoxypropyl)phosphonic acid by fermentation.

It is an object of the present invention to provide methods for producing (-) (cis-1,2-epoxypropyl)phosphonic acid in enhanced yields by fermentation. Other objects will be apparent from the detailed description of this invention hereinafter provided.

In accordance with this invention, it is found that suitable strains of Streptomyces, when grown in mediums containing mercapto containing organic compounds, produce enhanced yields of (-) (cis-1,2-epoxypropyl)phosphonic acid. The effect of the added mercapto compound is to produce increased amounts of the antibiotic than would otherwise be produced in the medium without the added mercapto compound. Thus, suitable media containing adequate sources of carbon, nitrogen and inorganic salts produce greater amounts of the antibiotic when a mercapto-containing compound is added to such media.

Aqueous mediums, such as those employed for the production of other antibiotics, are suitable for producing this now antibiotic. Such mediums contain sources of carbon and nitrogen assimilable by the micro-organism and inorganic salts. In addition, the fermentation mediums contain traces of metals necessary for the growth of the micro-organism which are commonly supplied as impurities incidental to the addition of other constituents of the medium.

In general, carbohydrates such as sugars, for example, sucrose, maltose, fructose, lactose, and the like, and starches such as grains, for example oats and rye, corn starch, cornmeal, and the like, can be used either alone or in combination as sources of assimilable carbon in the nutrient medium. The exact quantity of the carbohydrate source or sources utilized in the medium will depend in part upon the other ingredients of the medium, but it is usually found that an amount of carbohydrate between about 1 and 6 percent by weight of the medium is satisfactory. These carbon sources can be used individually or several such carbon sources may be combined in the medium.

Satisfactory nitrogen sources include myriad proteinaceous materials such as various forms of hydrolysates of casein, soybean meal, corn steep liquor, distilled solubles, yeast hydrolysats, tomato paste, and the like. The various sources of nitrogen, either along or in combination, are used in amounts ranging from about 0.2 to 7 percent by weight of the aqueous medium. Examples of mediums suitable for the production of (-) (cis-1,2-epoxypropyl)phosphonic acid are shown in the examples which follow.

The fermentation using the (-) (cis-1,2-epoxypropyl)phosphonic acid producing micro-organisms can be carried out at temperatures ranging from about 25° to 38° C. For optimum results, it is most convenient to conduct these fermentations at temperatures between 26° and 30° C. The pH of the nutrient mediums suitable for growing the Streptomyces and producing the antibiotic can vary from about 5.5 to 7.5.

Although the new antibiotic of this invention is produced by both surface and submerged cultures, it is presently preferred to carry out the fermentation in the submerged state. Small-scale fermentations are conveniently heating to 120° C., inoculating the flasks with either sore or a vegetative cellular growth of a (-) (cis-1,2-epoxypropyl) hosphonic acid producing strain of with cotton, and permitting the fermentation to proceed in a constant temperature room at about 28° C. on a shaker for 3-5 days. For larger scale work, it is preferable to conduct the fermentation in suitable tanks provided with an agitator and a means of aerating the fermentation medium. In this method, the nutrient medium is made up in the tank and sterilized by heating at 120° C. After cooling, the sterilized medium is inoculated with a suitable source of vegetative cellular growth of the Streptomyces and the fermentation is permitted to proceed for 2–4 days while agitating and/or aerating the nutrient medium and maintaining the temperature at about 28° C. This method of producing (-) (cis-1,2-epoxypropyl)phosphonic acid is particularly suited for the preparation of large quantities of the new antibiotic.

In carrying out the production of the antibiotic in the submerged state, a small amount of a suitable antifoam agent such as soybean oil, castor oil, 1 percent octadecanol in mineral oil, or a polymerized propylene glycol such as Polyglycol 2,000 can be added to the fermentation broth to control excessive foaming during the fermentation.

The amount of mercapto-containing compound necessary to produce greater yields of antibiotic will depend upon the specific ingredients of the particular medium and the particular mercapto compound. An amount of the mercapto compound as low as 50 milligrams per liter is found to produce greater amounts of the antibiotic than is produced in the same medium without the mercapto compound. Generally, it is preferred to add from 50 to 1,000 mg. of mercapto compound per liter of medium, although larger amounts can be used without affecting the fermentation. The optimum amount of mercapto compound producing maximum yields of antibiotic is readily determined by experiment using the Proteus vulgaris assay to determine the amount of antibiotic produced.

In carrying out the processes of this invention, various mercapto-containing compounds can be used. Examples of such compounds that might be mentioned are cysteine, homocysteins, acyl cysteine such as acetyl cysteine, glutathione, and the like.

EXAMPLE 1

A seed medium (40 ml. in a 250 ml. baffled Erlenmeyer flask) of the following composition:

| | |
|---|---|
| Cornstarch | 2% |
| L-asparagine | 0.5% |
| Sodium Citrate | 0.4% |
| $K_2HPO_4$ | 0.1% |
| $CaCl_2 \cdot 2H_2O$ | 0.05% |
| $MgSO_4 \cdot 7H_2O$ | 0.02% |
| $COCl_2 \cdot 6H_2O$ | 0.01% |
| $MnSO_4 \cdot 4/H_2O$ | 10 mg./l. |
| $CuCl_2 \cdot 2H_2O$ | 0.25 mg./l. |
| $FeSO_4 \cdot 7H_2O$ | 10 mg./l. |
| $H_3BO_3$ | 0.56 mg./l. |
| Distilled water | q.s. | is adjusted to pH 6.8–7.0 and sterilized by heating at 121° C. at 15 p.s.i. for 15 minutes. The sterilized medium is inoculated with *Streptomyces fradiae* NRRL B-3359 grown on an agar slant of the following composition:

| | |
|---|---|
| Cornstarch | 1% |
| L-asparagine | 0.1% |
| K₂HPO₄ | 0.1% |
| Agar | 2.0% |
| Tap water | q.s. |

The inoculated medium is incubated at 28° C. on a 220 r.p.m. shaking machine for 48–72 hours and then is used immediately or stored at 5° C. until used.

One ml. of the resulting inoculum is added to 30 ml. of sterile medium of the composition described above in 250 ml. Erlenmeyer flasks. Other flasks containing the same amount of sterile medium to which is added a solution of L-cysteine HCl, sterilized by Millipore filtration, are similarly inoculated. The final concentration of L-cysteine HCl in the uredium is 500 mg./ml. The inoculated flasks are grown on a 220 r.p.m. shaking machine at 28° C. for 4 days. The cells are then removed by centrifugation and the clarified broth is diluted with 0.05 M Tris [(hydroxymethyl)-aminomethane] buffer adjusted to pH 8.0. The concentration of the (−) (cis-1,2-epoxypropyl) phosphonic acid produced in the fermentation broth is determined by assay with *Proteus vulgaris* NRRL B-336.

The following table shows the antibiotic content of the broths with and without the added L-cysteine in three experiments:

| | Antibiotic Content µg./ml. | | |
|---|---|---|---|
| | Expt. 1 | 2 | 3 |
| Addition | | | |
| None | 18.3 | 19.3 | 12.8 |
| 500 µg./ml. of L-cysteine·HCl | 24.8 | 23.5 | 24.1 |

Similar results are obtained when other (−) (cis-1,2-epoxypropyl)phosphonic acid producing strains of *Streptomyces fradiae*, such as NRRL 3358, 3359, and 3360, *Streptomyces viridochromogenes*, such as NRRL 3413, 3414, 3415, 3416 and 3427, or *Streptomyces wedmorensis* NRRL 3426 are used in place of *S. fradiae* NRRL 13-3359.

The assay using *Proteus vulgaris* NRRL B-3361 is carried out as follows.

The test culture is maintained as a slant culture on nutrient agar (Difco) plus 0.2 percent yeast extract (Difco). The inoculated slants are incubated at 37° C. for 18–24 hours and stored at refrigerator temperatures for 1 week, fresh slants being prepared each week.

The inoculum for the assay plates is prepared each day by inoculating a 250 ml. Erlenmeyer flask containing 50 ml. of nutrient broth (Difco) plus 0.2 percent yeast extract (Difco) with a scraping from the slant. The flask is incubated at 37° C. on a shaking machine for 18–24 hours. The broth culture is then adjusted to 40 percent transmittance at a wavelength of 660mµ using a Bausch & Lomb Spectronic 20 by the addition of 0.2 percent yeast extract solution to the growth. Uninoculated broth is used as a blank for this determination. Thirty Ml. of the adjusted broth is used to inoculate 1 liter of medium.

Nutrient agar (Difco) plus 0.2 percent yeast extract (Difco) is used as the assay medium. This medium is prepated, sterilized by autoclaing, and allowed to cool to -b 50° C. After the medium is inoculated, 10 ml. is added to sterile petri dishes and the medium is allowed to solidify.

Samples of the supernatant liquid to be assayed are diluted in 0.05 M tris buffer at pH 8.0 to an appropriate concentration. Cylinders with an internal diameter of 8 mm. are placed on the surface of the agar assay plate; to the samples and are filled with a standard solution containing (−) (cis-1,2-epoxypropyl)phosphonic acid (free acid) 1.5 µg./ml. The plates are incubated at 37° C. for 18 hours and the zone diameters in mmg. are determined. The zone of clearance for the standard solution varies between 16.5 and 19 mm. between days, therefore with each set of assays a standard curve is made, and the potency of the sample ascertained by means of a nomagraph.

EXAMPLE 2

When the process of example 1 is repeated using 500 g./ml. of D,L-homocysteine in place of L-cysteine, the assays of the resulting broths are shown in the following table:

| | Antibiotic Content µg./ml. | |
|---|---|---|
| Addition | Expt. 1 | |
| None | 15.9 | 12.8 |
| 500 µg./ml. of D,L-homocysteine | 20.1 | 19.3 |

Similar results are obtained when other (−)(cis-1,2-epoxypropyl)phosphonic acid producing strains of *Streptomyces fradiae*, such as NRRL 3,358, 3,359, and 3,360 *Streptomyces viridochromogenes*, such as NRRL 3,413, 3,414, 3,415, 3,416 and 3,427, or *Streptomyces wedmorensis* NRRL 3,426 are used in place of *S. fradiae* NRRL 13-3,359.

EXAMPLE 3

In another experiment carried out following the procedures described in example 1 *Streptomyces fradiae* NRRL 13-3,359 is grown in mediums with and without 500 µ g./ml. of acetyl L-cysteine with the following results:

| | Antibiotic Content µg./ml. |
|---|---|
| Addition | Expt. 1 |
| None | 11.0 |
| 500 µg./ml. of Acetyl L-cysteine | 17.8 |
| 500 µg./ml. of L-cysteine HCl | 14.5 |

EXAMPLE 4

In a further experiment carried as described in example 1 *Streptomyces fradiae* NRRL B-3,359 is grown in mediums with and without reduced glutathione with the following results:

| | Antibiotic Content µg./ml. | |
|---|---|---|
| Addition | Expt. 1 | 2 |
| None | 11.0 | 12.8 |
| 500 µg./ml. of glutathione | 14.4 | 16.2 |
| 500 µg./ml. of L-cysteine·HCl | — | 24.1 |

Similar results are obtained when other (−)(cis-1,2-epoxypropyl)phosphonic acid producing strains of *Streptomyces fradiae*, such as NRRL 3,358, 3,359, and 3,360, *Streptomyces viridochromogenes*, such as NRRL 3,413, 3,414, 3,415, 3,416 and 3,427, or *Streptomyces Wedmorensis* NRRL 3,426 are used in place of *S. fradiae* NRRL 13-3,359.

EXAMPLE 5

In another experiment carried at as described in example 1 except that 0.1 percent monosodium glutamate is added to both the seed and production mediums *Streptomyces fradiae* NRRL B-3,359 is grown in mediums with and without L-cysteine. HCl and DL-homocysteine with the following results:

| | Antibiotic Content µg./ml. | | |
|---|---|---|---|
| Addition | Expt. 1 | 2 | 3 |
| None | 22.7 | 16.9 | 25.8 |
| 500 µg./ml. of L-cysteine·HCl | 27.8 | 25.9 | |

500 µg./ml. of DL-homocysteine            22.3     31.7

In a further experiment carried out as described in example 5 using acetyl cysteine and L-cysteine. HCl the following results are obtained:

Antibiotic Content µg./ml.

| Addition | |
|---|---|
| None | 13.1 |
| 500 µg./ml. of acetylcysteine | 24.6 |
| 500 µg./ml. of L-cysteine·HCl | |

The antibiotic substance, (−) (cis-1,2-epoxypropyl)phosphonic acid, produced in the fermentation broths by the processes of this invention, can be recovered by a number of procedures. One such procedure comprises adsorbing the antibiotic on anion exchange resins, for example, resins composed of quaternary ammonium exchange or polyalkylamine groups attached to a styrene-divinylbenzene polymer lattice. The adsorbed antibiotic is readily eluted from the resin adsorbate with aqueous or aqueous alcoholic solutions of salts such as ammonium chloride, sodium chloride, sodium acetate, and the like. The eluate so obtained can be further purified, if desired, by other purification procedures. Thus, the eluate can be purified by passing it through a bed of polyacrylamide gel having pore sizes allowing the fractionation of substances having molecular weights between 200 and 2,000. Purification of the antibiotic can also be achieved by passing the impure antibiotic solution through a strongly acidic cation exchange resin composed of nuclear sulfonic acid exchange groups attached to a styrene-divinylbenzene polymer lattice, and developing the resin with water. These purification procedures are described in detail in the pending application of Thomas W. Miller, Ser. No. 699,376, filed Jan. 22, 1968 (Case No. 11,579).

Alternatively, the antibiotic can be purified by absorption on alumina; either basic or acid washed alumina being suitable for this purification. The adsorbed antibiotic can be eluted from the alumina most conveniently by aqueous or aqueous-alcoholic ammonium hydroxide solutions having a pH of about 11.2 and fractionally collecting the eluate. Purification of impure solid fractions containing the ammonium salt of Antibiotic 833A can also be effected by dissolving such material in methanol, adding an equal volume of n-butanol, evaporating off the methanol, filtering off any butanol insoluble material, and recovering a butanol solution containing the ammonium salt of the antibiotic of enhanced purity. The ammonium salt can then be obtained in solid form by evaporating the butanol solution to dryness under reduced pressure. Alternatively, the ammonium salt can be extracted from the butanol solution with water to obtain an aqueous solution of the ammonium salt. The calcium salt of the antibiotic is produced by adding calcium hydroxide to the aqueous solution of the ammonium salt and warming the resulting solution under reduced pressure. Alternatively, the calcium salt is also obtained by passing a solution of another salt of (−) (cis-1,2-epoxypropyl)phosphonic acid over a cation exchange resin on the calcium cycle. The calcium salt crystallizes from aqueous solutions having a concentration of 10 mg./ml. upon standing or with agitation. These purification procedures are described in more detail in the pending application of Louis Chaiet, Ser. No. 699,377, filed Jan. 22, 1968 (Case No. 11,580).

(−) (Cis-1,2-epoxypropyl)phosphonic acid and its salts are useful antimicrobial agents, which are active in inhibiting the growth of both gram-positive and gram-negative pathogenic bacterial. This antibiotic and particularly its salts are active against *Bacillus*, *Escherichia*, *Staphylococci*, *Salmonella* and *Proteus* pathogens, and antibiotic-resistant strains thereof. Illustrative of such pathogens are *Escherichia coli*, *Salmonella schottmuelleri*, *Salmonella gallinarum*, *Proteus vulgaris*, *Proteus mirabilis*, *Proteus morganii*, and *Staphylococcus aureus*. Thus, (−) (cis-1,2-epoxypropyl)phosphonic acid and salts thereof can be used as antiseptic agents to remove susceptible organisms from pharmaceutical, dental, and medical equipment and other areas subject to infection by such organisms Similarly, they can be used to separate certain microorganisms from mixtures of micro-organisms. Salts of (−) (cis-1,2-epoxypropyl)phosphonic acid are also useful in the treatment of diseases caused by bacterial infections in man and animals and are particularly valuable in this respect since they are active against resistant strains of pathogens. The salts are especially valuable since they are effective when given orally, although they can also be administered parenterally.

When (−) (cis-1,2-epoxypropyl)phosphonic acid or its salts are used for combatting bacteria in man or lower animals, they may be administered orally in a dosage unit form such as capsules or tablets, or in a liquid solution or suspension. Alternatively, the antibiotic can be administered parenterally by injection. These formulations can be prepared using suitable diluents, extenders, granulating agents, preservatives, binders, flavoring agents, and coating agents known to those skilled in this art.

(−) (Cis-1,2-epoxypropyl)phosphonic acid can be represented by the formula:

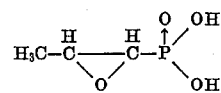

This substance is an acidic compound which is named as (−) (cis-1,2-epoxypropyl)phosphonic acid in accordance with present chemical nomenclature practice; the (−) indicating that this phosphonic acid rotates plane-polarized light in a counterclockwise direction (to the left as viewed by the observer) when the rotation of its disodium salt is measured in water (5 percent concentration) at 405 µ. The designation cis used in describing the 1,2-epoxypropylphosphonic acid compound means that the hydrogen atoms attached to carbon atoms 1 and 2 of the propylphosphonic acid are on the same side of the oxide ring.

The structural formula of this antibiotic substance has been shown in the planar formula for the sake of convenience. However, the antibiotic can also be depicted spatially as follows:

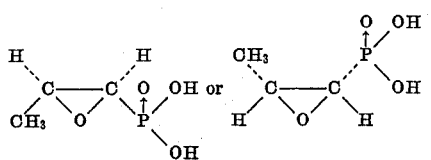

We claim:
1. A process for producing (−) (cis-1,2-epoxypropyl)phosphonic acid in enhanced yields which comprises growing a (−) (cis-1,2-epoxypropyl)phosphonic acid producing *Streptomyces* selected from the group consisting of *S. fradiae*, *S. wedmorensis*, and *S. viridochromogenes* in an aqueous nutrient medium under aerobic conditions comprising from 1 to 6 percent by weight of assimible carbohydrate, 0.2 to 7 percent by weight of proteinaceous material, and from 50 to 1,000 mg. per liter of medium of an added mercapto compound selected from the group consisting of cysteine, homocysteine, acetylcysteine, and glutathione.

2. The process of claim 1 wherein the pH is from 5.5 to 7.5

3. The process of claim 1 wherein the *streptomyces* is a species of *Streptomyces fradiae*.

4. The process of claim 1 wherein the species of *Streptomyces* is *Streptomyces wedmorensis*.

5. The process of claim 1 wherein the species of *Streptomyces* is *Streptomyces wedmorensis*.

6. The process of claim 1 wherein the mercapto-containing compound is cysteine.

7. The process of claim 1 wherein the mercapto-containing compound is homocysteine.

8. The process of claim 1 wherein the mercapto-containing compound is glutathione.

9. The process of claim 1 wherein the mercapto-containing compound is DL homocysteine.

10. The process of claim 1 wherein the mercapto-containing compound is L-cysteine.

* * * * *

UNITED STATES PATENT OFFICE
CERTIFICATE OF CORRECTION

Patent No. 3,625,831               Dated December 7, 1971

Inventor(s) Arnold L. Demain, et al

It is certified that error appears in the above-identified patent and that said Letters Patent are hereby corrected as shown below:

Column 6, line 73, "Streptomyces wedmorensis" should read -- Streptomyces viridochromogenes -- .

Signed and sealed this 17th day of October 1972.

(SEAL)
Attest:

EDWARD M. FLETCHER, JR.              ROBERT GOTTSCHALK
Attesting Officer                    Commissioner of Patents